United States Patent [19]

Terumoto

[11] 4,058,364
[45] Nov. 15, 1977

[54] HIGH-PRESSURE THERMAL STERILIZER HAVING LIQUID RECIRCULATING MEANS

[75] Inventor: Masahiro Terumoto, Amagasaki, Japan

[73] Assignee: Q. P Corporation, Tokyo, Japan

[21] Appl. No.: 631,136

[22] Filed: Nov. 11, 1975

[30] Foreign Application Priority Data

Nov. 22, 1974 Japan .................. 49-134826
Oct. 7, 1975 Japan .................. 50-121636

[51] Int. Cl.² .......................... A23L 3/04; A61L 3/00
[52] U.S. Cl. .......................................... 21/80; 21/103; 21/99; 99/362
[58] Field of Search .............. 21/80, 103, 104, 99; 426/407, 409, 521–523; 99/362, 366, 368, 361

[56] References Cited

U.S. PATENT DOCUMENTS

| 1,987,414 | 1/1935 | Omsted | 99/362 |
|---|---|---|---|
| 2,835,003 | 5/1958 | Abrams | 21/80 |
| 3,418,918 | 12/1965 | Beauvais et al. | 99/362 |
| 3,473,934 | 10/1969 | Pech | 426/407 |
| 3,475,034 | 10/1969 | Hayashi | 68/5 E |
| 3,719,264 | 3/1973 | Moreau | 21/80 |
| 3,783,649 | 1/1974 | Yamamoto et al. | 68/5 E |
| 3,824,917 | 7/1974 | Kawahara et al. | 21/80 |

*Primary Examiner*—Morris O. Wolk
*Assistant Examiner*—Bradley Garris
*Attorney, Agent, or Firm*—Browdy and Neimark

[57] ABSTRACT

A high-pressure sterilizer comprises a high-pressure tank having an inlet and an outlet for the objects to be treated and also having formed therein a heating chamber containing a heating liquid and a cooling chamber containing a cooling liquid, and transfer means for continuously transferring the objects to be treated through said inlet and outlet of the high-pressure tank while passing through the liquids in said heating and cooling chambers to thereby continuously sterilize the objects to be treated by heating. Said heating chamber and cooling chamber are separated by a pair of partition walls to form a space therebetween. Said transfer means are disposed in alignment with passage holes formed in said partition walls in opposed relation below the liquid level and with cylindrical passages provided in the tank in alignment with said passage holes. Said transfer means are also provided with attachments adapted for sectioning each said cylindrical passage while maintaining a small space between said means and the wall surface of each said cylindrical passage in the tank wall. There is also provided a circulation means whereby the liquid oveflown from said passage holes and cylindrical passages is returned back to the heating chamber or cooling chamber.

7 Claims, 4 Drawing Figures

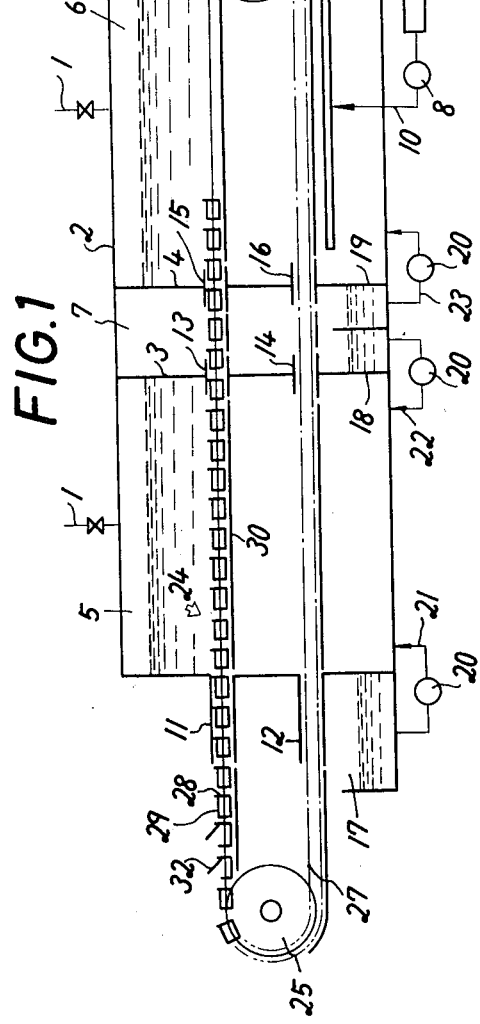
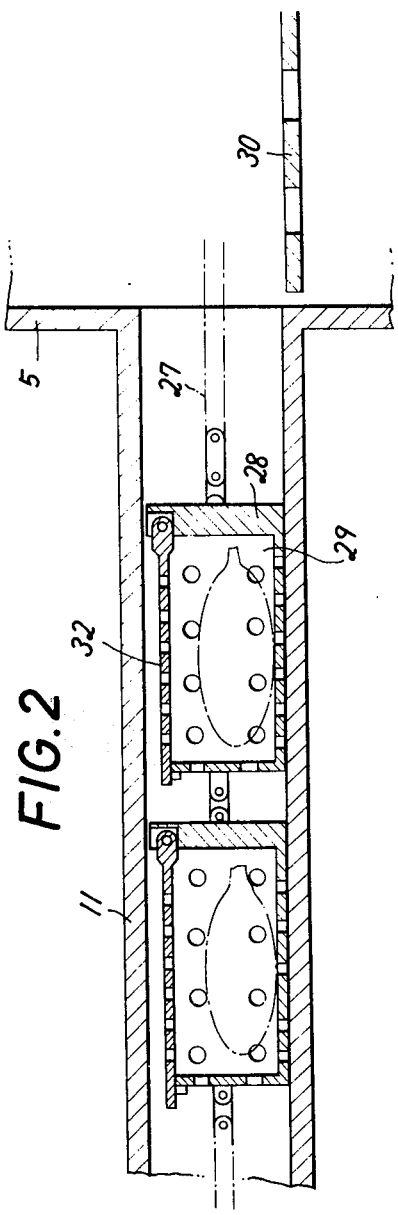

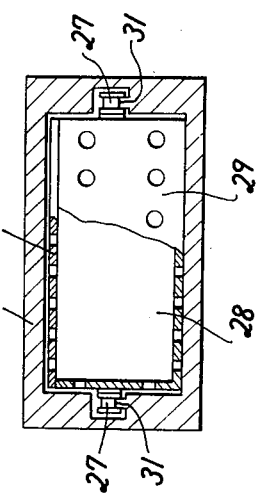
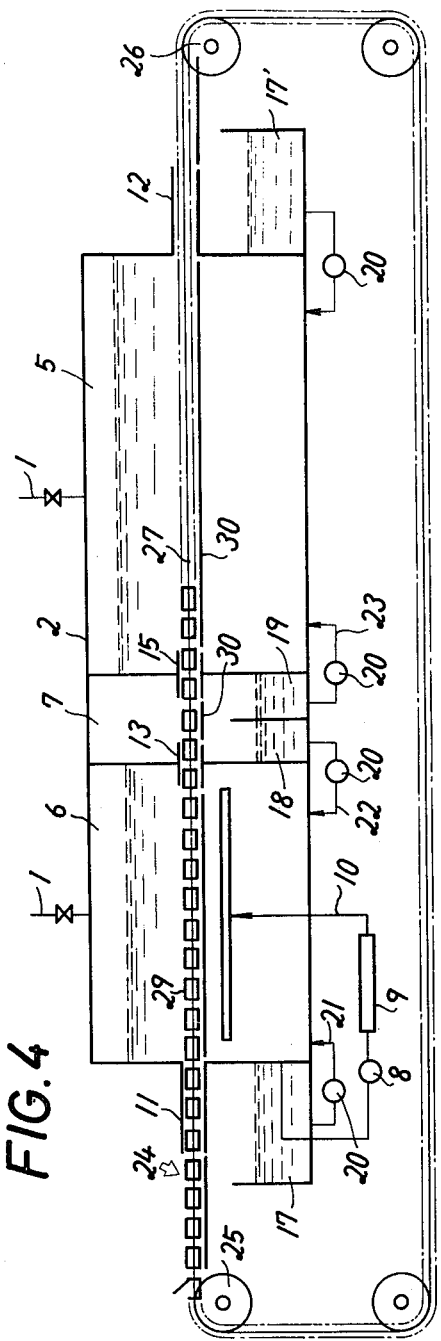

HIGH-PRESSURE THERMAL STERILIZER HAVING LIQUID RECIRCULATING MEANS

This invention relates to a high-pressure sterilizer for thermally sterilizing food-packed cans, bags and the like continuously in a high-pressure tank.

It is already known to thermally sterilize cans, bags and other like matters to be treated by continuously passing them through a high-pressure tank where they are heated and cooled successively, as for instance revealed in U.S. Pat. Nos. 3,418,918 and 3,824,917.

Any of these known sterilizers, however, has many defects such as complicated transfer mechanism for transferring the objects to be treated through the high-pressure tank and also complicated means for introducing or discharging the objects into or out of the tank or means for passing them from the heating chamber to the cooling chamber. It is also very difficult to perform always constant and smooth transfer of the objects to be treated, and further, cooling water would lower the temperature of the heating medium to necessitate extra supply of heat.

For instance, in the device proposed in U.S. Pat. No. 3,418,918, specific rotors for sealing the transfer passage must be provided in connection with transfer means at the inlet and outlet of the high-pressure tank, and also the transfer passage must be curved arcuately, so that there are required many chain wheels and other guide means for guiding the transfer means, resulting in the very complicated transfer mechanism.

Further, as heated steam used for sterilization is contacted with the cooling liquid, they are mixed up to necessitate extra supply of heat, resulting in reduced thermal efficiency. Also, transfer means positioned between the heating and cooling chambers can not be arranged linearly with relation to the transfer means positioned at the inlet and outlet of the tank.

In the case of U.S. Pat. No. 3,824,917, plural chambers must be provided at the inlet and outlet of the high-pressure tank, resulting in the complicated tank structure. Also, for transferring the objects to be treated from the heating chamber containing a heating liquid into the cooling chamber containing a cooling liquid, transfer means must be so disposed that they once emerge above the gaseous phase and then by-pass the partition wall between the two chambers, resulting in complicated arrangement and structure of transfer means. Further, as the heating chamber and the cooling chamber are communicated at the gaseous phase portion, the thermal efficiency is inevitably lowered.

The present invention has been devised for overcoming such defects of the conventional devices, and it is therefore an object of the present invention to provide a high-pressure sterilizer in which a space is provided between the heating chamber containing a heating liquid and the cooling chamber containing a cooling liquid, and transfer means are positioned rectilinearly in the passage holes formed in both chambers below the liquid level so that the objects to be treated may be passed rectilinearly through the liquids in said both chambers to thereby realize simplification of the transfer means and smooth transfer of the objects to be treated. Also, since the heating chamber and cooling chamber are provided separate from each other, the heating liquid and cooling liquid are not mixed up and hence the thermal efficiency is not lowered.

It is another object of the present invention to provide a high-pressure sterilizer in which the construction of the inlet and outlet of the high-pressure tank for feeding and discharging the objects to be treated as well as the transfer means disposed in such portions are simplified so that the objects to be treated can move into or out of the high-pressure tank rectilinearly so as to allow easy, smooth and continuous sterilization operation.

It is still another object of the present invention to provide a high-pressure sterilizer in which the inlet and outlet of the high-pressure tank for the objects to be treated and the respective passage holes formed in the walls of the heating chamber and cooling chamber in said tank are positioned in alignment with each other, with transfer means being disposed rectilinearly in these portions to simplify the construction of transfer means, driving mechanism and other means and to facilitate mounting of these means in the tank while allowing reduction of driving power and easy and smooth transfer of the objects to be treated.

It is yet another object of the present invention to provide a high-pressure sterilizer in which each of the cylindrical transfer passages at the inlet and outlet of the high-pressure tank is divided into a plurality of sections by attachments provided to the transfer means so that the pressure of the effluent liquid from the high-pressure tank will be reduced gradually while also allowing considerable decrease of the amount of effluent liquid as well as easy supply of liquid into the tank.

It is a further object of the present invention to provide a high-pressure sterilizer in which the liquid overflown into the intermediate chamber from the heating or cooling chamber is refluxed into said chamber so as to allow minimization of supply of the heating liquid and cooling liquid as well as loss of heat.

The other objects and features of the present invention will become apparent from a review of the following detailed description of preferred embodiments of the invention.

FIG. 1 is a general sectional view showing an embodiment of the present invention;

FIG. 2 is a partial longitudinal-sectional front view illustrating the essentials of one embodiment of the present invention;

FIG. 3 is a longitudinal-sectional side view thereof; and

FIG. 4 is a general sectional view showing another embodiment of the present invention.

The present invention is now described in detail by way of an embodiment thereof with reference to FIGS. 1 to 3 of the drawings.

The device of this invention comprises a sealed high-pressure tank 2 the inside of which is maintained at a high pressure by means of a pressured air supply pipe 1. Said tank 2 is sectioned at its central part by a pair of opposed partition walls 3, 4 so as to define a cooling chamber 5 containing cold water in the fore portion of the tank, that is, in front of the partition wall 3, a heating chamber 6 containing heated water in the rear portion of the tank, and an intermediate space chamber 7. Heated water in said heating chamber 6 may be circulated through a circulation pipe 10 provided with a pump 8 and a heating device 9. Although not shown, cooling water in the cooling chamber 5 may be also similarly circulated while performing its cooling function.

In the front end of the high-pressure tank 2 and at the levels below the cooling liquid surface in the cooling chamber 5 are formed a pair of protuberant cylindrical transfer passages 11 and 12 which are rectangular in sectional shape. Also, a pair of mere holes or short sleeve-like passage holes 13, 14 and 15, 16 are formed in the respective partition walls 3 and 4 at the positions of the same levels as said cylindrical transfer passages 11 and 12, respectively.

Below the protuberant cylindrical passages 11, 12, and passages holes 13, 14 and 15, 16 in the space chamber 7 are provided reservoir tanks 17, 18 and 19, respectively, which are connected into the cooling chamber 5 and heating chamber 6, respectively, by way of return pipes 21, 22 and 23 each of which is provided with a pump 20, whereby the cooling liquid or heating liquid overflown from said cylindrical transfer passages 11, 12 or passage holes 13, 14 or 15, 16 is sent back into the cooling chamber 5 or heating chamber 6.

Transfer means 24 for bringing the objects to be treated into or out of the high-pressure tank 2 comprise a pair of endless conveyance chains 27, 27 passed between and round a driving chain wheel 25 disposed outside of the tank and another chain wheel 26 disposed in the heating chamber 6, attachments 28 mounted between said pair of conveyance chains, porous retainers 29 arranged to be openable and closable for containing therein the objects to be treated, and guide means 30. Said pair of endless conveyance chains 27, 27 run out from the driving chain wheel 25 and pass the cylindrical passage 11, liquid phase in the cooling chamber 5, passage hole 13, space chamber 7, passage hole 15 and liquid phase in the heating chamber 6 to reach the chain wheel 26 whence the chains further advance by passing the passage hole 16, space chamber 7, passage hole 14, liquid phase in the cooling chamber 5 and cylindrical transfer passage 12 to return to the driving chain wheel 25. When passing the cylindrical passages 11, 12, said chains are guided by the guide channels 31.

Transfer attachments 28 supported between said conveyance chains 27, 27 are of the same sectional shape as the cylindrical transfer passages 11, 12 but slightly smaller in size than said passages, and are attached to the conveyance chains 27, 27 at such an interval as to divide each of said cylindrical passages 11, 12 into several, preferably 5 to 7 sections.

On one side of each of said transfer attachments 28 is integrally provided a box-shaped retainer 29 having said attachment as its one side, that is, said attachment constitutes a part of the retainer 29, and a plurality of holes are formed in the sides of the retainer other than the attachment side. Also, an openable cover 32 is pivotally secured to the retainer so that the objects to be treated may be contained therein. The transfer attachment 28 may not necessarily be formed integral with the retainer 29 but may be provided separately.

Guide means 30 are provided along the conveyance chains excluding the portions where the cylindrical passages 11, 12 are provided, so as to support the transfer attachments 28 and retainers 29.

In operation of the just described embodiment of the present invention, first the cover 32 of each retainer 29 is opened at a position adjacent the driving chain wheel 25 and an objects to be sterilized are contained in said retainer, and the latter is carried forward on a pair of conveyance chains 27, 27 of transfer means 24. Each said retainer first passes through the cylindrical passage 11 to enter the liquid in the cooling chamber 5 and thence further passes through the passage hole 13, space chamber 7 and passage hole 15 to enter the heated liquid in the heating chamber 6 where the articles in the retainer are thermally sterilized. The retainer turns round the chain wheel 26 and passes through the passage hole 16, space 7 and passage hole 14 to enter the cold liquid in the cooling chamber 5 whereby the retainer is cooled and finally led out of the high-pressure tank 2, and then the cover 32 of the retainer is opened to take out the treated articles.

During this transfer operation, cooling water overflows from the front ends of the cylindrical passages 11, 12, but as attachments 28 are provided in such a manner as to divide each of said cylindrical passages into plural sections and also the space between each attachment and the wall surface of the corresponding cylindrical passage is minimized, pressure in the high-pressure tank 2 is gradually reduced and hence the amount of liquid overflowing from the front ends of said cylindrical passages 11, 12 is limited and the overflown liquid is sent back into the cooling chamber 5 by the operation of pump 20.

Cooling water in the cooling chamber 5 also overflows into the reservoir tank 18 from the passage holes 13, 14 while heating water in the heating chamber 6 into the reservoir tank 19 from the passage holes 15, 16, but such effluent water is also brought back into the cooling chamber 5 or heating chamber 6 by way of return pipe 22 or 23 by the operation of a pump 20.

Referring now to FIG. 4, there is shown another embodiment of the present invention in which the objects to be treated are introduced into the high-pressure tank 2 from its one end and discharged from the other end. In the fore portion of the high-pressure tank 2 is formed a heating chamber 6 containing heated water, and a cooling chamber 5 containing cold water is formed in the rear portion of the tank, with a space 7 being formed between said both chambers. In the end face of the tank on the side of the heating chamber 6 is provided a cylindrical inlet passage 11, and a similar outlet passage 12 is formed in the other end face of the tank on the side of the cooling chamber 5, and opposed passage holes 13, 15 are formed in the partition walls 3, 4 in alignment with said cylindrical passages 11, 12. The upper travelling straight portion alone of the conveyance chain 27 of transfer means 24 is disposed in linear alignment with said cylindrical passage 11, passage holes 13, 15 and cylindrical passage 12, while the lower travelling portion of the conveyance chain 27 and the chain wheels associated therewith are disposed outside of the tank 2. The heating liquid and cooling liquid overflowing from the cylindrical passages 11, 12 and passage holes 13, 15 in the heating chamber 6 and cooling chamber 5 are received in the respective reservoir tanks 17, 17', 18, 19 and circulated back into said heating chamber 6 and cooling chamber 5, respectively, as in the preceding embodiment.

What is claimed is:

1. In a high-pressure sterilizer which has a high-pressure tank having an inlet and an outlet for objects to be sterilized and having formed therein a heating chamber which is to contain a heated liquid at a given level therein and a cooling chamber which is to contain a cooling liquid at a given level therein, and transfer means for transferring the objects to be sterilized from the inlet to the outlet of the tank through the heating chamber and cooling chamber thereby continuously to sterilize these objects by heating, the improvement comprising a space chamber between and separating said heating chamber from said cooling chamber, said space chamber being defined by a pair of spaced apart partition walls between said heating chamber and said cooling chamber, each of said partition walls having a pair of respective passage holes therein positioned below said given levels; and wherein said transfer means comprises an endless conveyor having upper and lower travelling portions passing linearly through said heating chamber, said cooling chamber and said space chamber, said upper and lower travelling portions being disposed in alignment with said passage holes formed in said pair of partition walls in opposed relation below the liquid levels in said heating and cooling chambers; at least two reservoir tanks provided within the space chamber to receive and segregate respectively heating liquid and cooling liquid as effluent liquids overflowing through said passage holes; and circulating means for recirculating the effluent liquids from said respective reservoir tanks back into said heating chamber and said cooling chamber, respectively.

2. In a high-pressure sterilizer which has a high-presure tank having an inlet and an outlet for objects to be sterilized and having formed therein a heating chamber which is to contain a heated liquid at a given level therein and a cooling chamber which is to contain a cooling liquid at a given level therein, and transfer means for continuously transferring the objects to be sterilized through the inlet and the outlet of the tank and through the heating and cooling chambers thereby continuously to sterilize these objects by heating, the improvement comprising a space chamber between and separating said heating chamber from said cooling chamber, said space chamber being defined by a pair of spaced apart partition walls between said heating chamber and said cooling chamber, each of said partition walls having a respective passage hole therein positioned below said given levels, and wherein said inlet and said outlet for the objects to be sterilized in said high-prsessure tank comprise passages having respective inner surfaces positioned below said liquid levels, and wherein said transfer means passes linearly through these passages, said passage holes and said heating, cooling and space chambers and includes an endless conveyor which is provided with a plurality of object holding chambers spaced apart with an interval distance therebetween such that said holding chambers occupy each of said simultaneously, said holding chambers and said passages being arranged and constructed to provide a narrow space between each of said holding chambers and said inner surfaces of said passages, at least two reservoir tanks provided within said space chamber to receive and segregate respectively heating and cooling liquid as effluent liquids overflowing through said passage holes; and circulating means for recirculating the effluent liquids from said respective reservoir tanks back into said heating chamber and said cooling chamber, respectively.

3. A high-pressure sterilizer according to claim 2, wherein one of said passages is provided in each end of said high-pressure tank, said heating chamber being provided at an input side of said high-pressure tank while said cooling chamber is provided at an output side of said high-pressure tank, and wherein an upper travelling portion alone of said endless conveyor is disposed within said high-pressure tank so as to introduce the objects to be sterilized into the tank from said input side thereof and to discharge sterilized objects from said output side of the tank.

4. In a high-pressure sterilizer which has a high-pressure tank having an inlet and an outlet for objects to be sterilized and having formed therein a heating chamber which is to contain a heating liquid at a given level therein and a cooling chamber which is to contain a cooling liquid at a given level therein, and transfer means for transferring the objects to be sterilized through the inlet and the outlet of the tank and through liquids in the heating chamber and the cooling chamber thereby continuously to sterilize the objects by heating, the improvement comprising a space chamber between and separating said heating chamber from said cooling chamber, said space chamber being defined by a pair of spaced apart partition walls each of said partition walls having passage holes therein positioned below said given levels; and wherein said transfer means comprises an endless conveyor having upper and lower travelling portions passing linearly through said heating chamber and said space chamber, said upper and lower travelling portions being disposed in alignment with said passage holes formed in said pair of partition walls at levels below said given levels, said inlet an said outlet of said tank being defined by passages having inner surfaces and being in alignment with corresponding ones of said passage holes, said endless conveyor being provided with a plurality of holding chambers with an interval distance therebetween such that a plurality of said holding chambers occupy each of said passages simultaneously said holding chambers and said passages being arranged and constructed to provide a narrow space between each of said holding chambers and said inner surfaces of said passages, and wherein said high-pressure tank further includes respective reservoir means for receiving and segregating respective overflow heating and cooling liquids from said passage holes and said passages, and circulation means coupled with said reservoir means for recirculating the overflow heating and cooling liquids from said passage holes and said passages respectively back into said heating chamber and said cooling chamber.

5. A high-pressure sterilizer according to claim 4, wherein said passages comprise a pair of passages provided at different vertical levels in one end of the high-pressure tank and wherein the upper and lower travelling portions of said endless conveyor are disposed to pass through said passages so as to introduce the objects to be sterilized into the tank from the upper passage and to discharge the sterilized objects from the lower passage, and wherein the cooling chamber is formed on one side of said tank and said heating chamber is formed on an opposite side of said tank.

6. A high-pressure sterilizer according to claim 4, wherein each of said holding chamber is provided with a retainer for containing the objects to be sterilized therein, said retainer being openable and closable and formed with a plurality of pores therein.

7. A high-pressure sterilizer according to claim 4, wherein said partition walls are respectively provided with a sleeve to define said passage holes.

* * * * *